US012592727B2

(12) United States Patent　　　　　(10) Patent No.:　US 12,592,727 B2
Startup et al.　　　　　　　　　　　　(45) Date of Patent:　Mar. 31, 2026

(54) OVERSAMPLED MULTIPLE-CORRELATOR SYMBOL SYNCHRONIZATION

(71) Applicant: Viasat, Inc., Carlsbad, CA (US)

(72) Inventors: James Startup, Tempe, AZ (US); Jeremy Pruitt, Gilbert, AZ (US)

(73) Assignee: Viasat, Inc., Carlsbad, CA (US)

( * ) Notice: Subject to any disclaimer, the term of this patent is extended or adjusted under 35 U.S.C. 154(b) by 439 days.

(21) Appl. No.: 17/792,537

(22) PCT Filed: Feb. 26, 2021

(86) PCT No.: PCT/US2021/020084

§ 371 (c)(1),
(2) Date: Jul. 13, 2022

(87) PCT Pub. No.: WO2021/174120

PCT Pub. Date: Sep. 2, 2021

(65) Prior Publication Data

US 2023/0045476 A1　Feb. 9, 2023

Related U.S. Application Data

(60) Provisional application No. 62/982,729, filed on Feb. 27, 2020.

(51) Int. Cl.
H04B 1/00　　(2006.01)
H04B 1/04　　(2006.01)
H04B 1/16　　(2006.01)

(52) U.S. Cl.
CPC ......... H04B 1/0078 (2013.01); H04B 1/0458 (2013.01); H04B 1/16 (2013.01)

(58) Field of Classification Search
CPC ...... H04B 1/0078; H04B 1/0458; H04B 1/16; H04W 52/0235; H03F 2200/451
See application file for complete search history.

(56) References Cited

U.S. PATENT DOCUMENTS 5,699,389 A　12/1997　Beladi et al.
6,567,462 B1　5/2003　Brunner et al.
(Continued)

FOREIGN PATENT DOCUMENTS

EP　　　3047619 A1　7/2016

OTHER PUBLICATIONS

Gardner, "A BPSK/QPSK Timing-Error Detector For Sampled Receivers", IEEE Transactions on Communications, vol. Com-34. No. 5, May 1986, 8 pages.
(Continued)

*Primary Examiner* — Quoc Thai N Vu
(74) *Attorney, Agent, or Firm* — Holland & Hart LLP

(57)　　　　ABSTRACT

Methods, systems, and devices for a wakeup receiver operation is described. A receiver may include a conversion circuit that converts an RF signal to a baseband signal, where the baseband signal comprise a set of symbols received at a symbol rate. The receiver may include an analog-to-digital converter that converts the baseband signal to samples at a sample rate greater than the symbol rate. The receiver may include a set of correlators, each correlator of the set may receive a respective subset of the samples of the baseband signal and generate a respective output. The receiver may include a compare circuit that receives the respective outputs from the set of correlators and compares the respective outputs with a threshold, where the compare circuit also generates a wakeup command based at least in part on at least one output of the respective outputs satisfying the threshold.

20 Claims, 5 Drawing Sheets

(56)  References Cited

U.S. PATENT DOCUMENTS

| | | | |
|---|---|---|---|
| 6,724,738 B1 * | 4/2004 | Storm ................ | H04B 1/70756 |
| | | | 370/335 |
| 7,274,763 B2 | 9/2007 | Hammes et al. | |
| 7,295,301 B2 | 11/2007 | Sinha et al. | |
| 8,098,692 B2 | 1/2012 | Albu et al. | |
| 8,306,172 B2 | 11/2012 | Kelleher et al. | |
| 8,391,415 B2 | 3/2013 | Kelleher et al. | |
| 8,976,907 B2 | 3/2015 | Boritzki | |
| 9,351,250 B2 | 5/2016 | Jafarian et al. | |
| 9,413,403 B2 | 8/2016 | Wentzloff et al. | |
| 9,544,848 B2 | 1/2017 | Jafarian et al. | |
| 10,759,384 B2 | 9/2020 | Perissakis et al. | |
| 2011/0128172 A1 * | 6/2011 | Srinivasa .............. | H03M 1/002 |
| | | | 341/172 |
| 2015/0087255 A1 * | 3/2015 | Wentzloff ........... | H04B 1/1027 |
| | | | 455/296 |
| 2017/0230889 A1 | 8/2017 | Zheng et al. | |
| 2019/0082385 A1 | 3/2019 | Shellhammer et al. | |
| 2019/0158133 A1 | 5/2019 | Wang et al. | |

OTHER PUBLICATIONS

International Search Report and Written Opinion, PCT/US2021/020084, dated Jun. 23, 2021, 10 pages.

* cited by examiner

Receiving Component

425

Converting Component

430

Generator Component

435

Output Component

440

420

400

1

OVERSAMPLED MULTIPLE-CORRELATOR SYMBOL SYNCHRONIZATION

CROSS REFERENCE

The present Application for Patent is a 371 national phase filing of International Patent Application No. PCT/US2021/020084 by STARTUP et al., entitled "OVERSAMPLED MULTIPLE-CORRELATOR SYMBOL SYNCHRONIZATION" filed Feb. 26, 2021, which claims the benefit of U.S. Provisional Patent Application No. 62/982,729 by STARTUP et al., entitled "OVERSAMPLETED MULTIPLE-CORRELATOR SYMBOL SYNCHRONIZATION," filed Feb. 27, 2020, each of which is assigned to the assignee hereof and each of which is expressly incorporated by reference in its entirety herein.

BACKGROUND

The following relates generally to receivers and more specifically to wakeup receivers and signal detection.

A low power receiver coupled with an electronic device may wakeup the electronic device based on a signal received from a transmitter. In some examples, the receiver may compare the incoming signal with a stored code and generate a wakeup command for the electronic device based on the comparison. In some cases, the receiver may not be synchronized (e.g., symbol-synchronized) with the transmitter—e.g., the receiver may receive an offset signal based on clock shift. In some examples, the receiver may incorrectly determine the incoming signal is not associated with the stored code based on the offset signal. In other examples, the receiver may consume additional power to synchronize the receiver timing with the incoming signal. Thus, reception of wakeup commands may present challenges for low power detection.

SUMMARY

The described techniques relate to improved methods, systems, devices, and apparatuses that support oversampled multiple-correlator symbol synchronization. A receiver may include a conversion circuit that converts a radio frequency (RF) signal to a baseband signal, where the baseband signal comprises a set of symbols received at a symbol rate. The receiver may include an analog-to-digital converter that converts the baseband signal to samples at a sample rate greater than the symbol rate. The receiver may include a set of correlators, each correlator of the set may receive a respective subset of the samples of the baseband signal and generate a respective output. The receiver may include a compare circuit that receives the respective outputs from the set of correlators and compares the respective outputs with a threshold, where the compare circuit also generates a wakeup command based at least in part on at least one output of the respective outputs satisfying the threshold.

2

Figure 3:
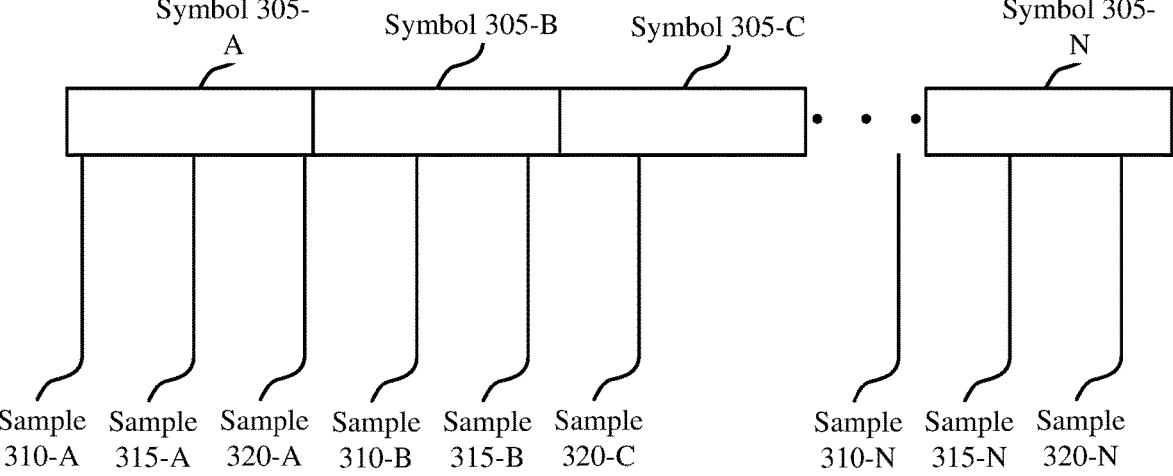

FIG. 3 illustrates an example of a timing diagram that supports oversampled multiple-correlator symbol synchronization in accordance with aspects of the present disclosure.

Figure 4:
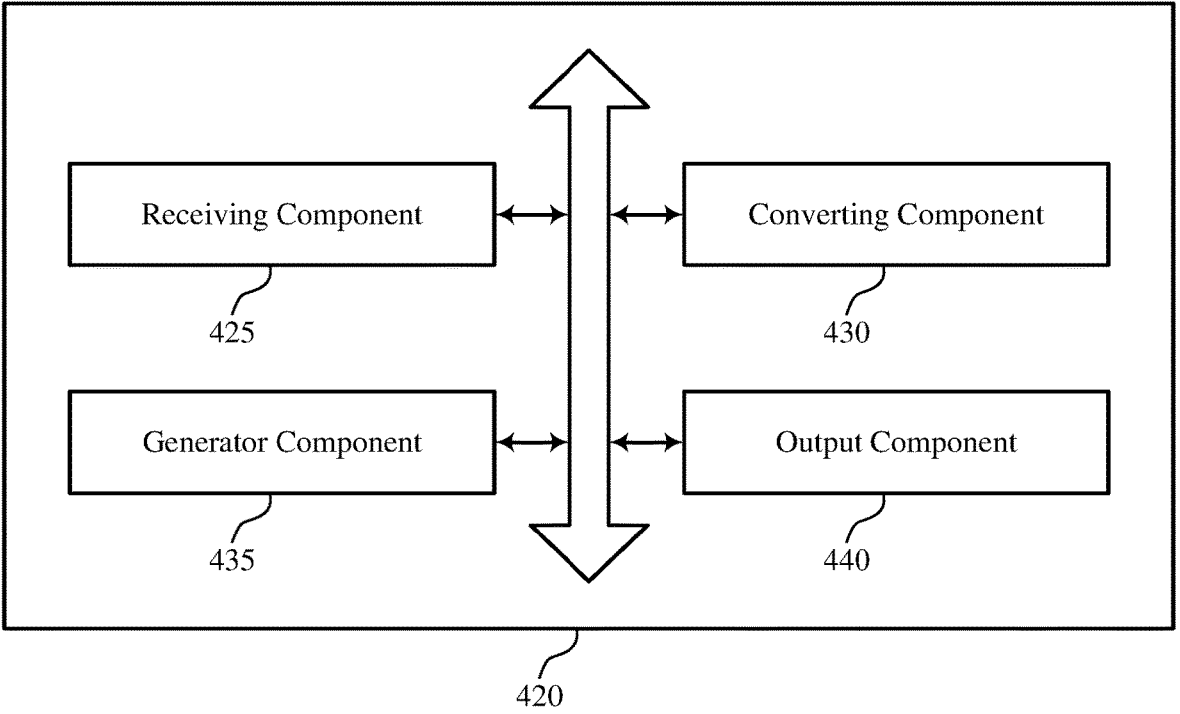
Figure 4:

FIG. 4 shows a block diagram of a receiver that supports oversampled multiple-correlator symbol synchronization in accordance with aspects of the present disclosure.

Figure 5:
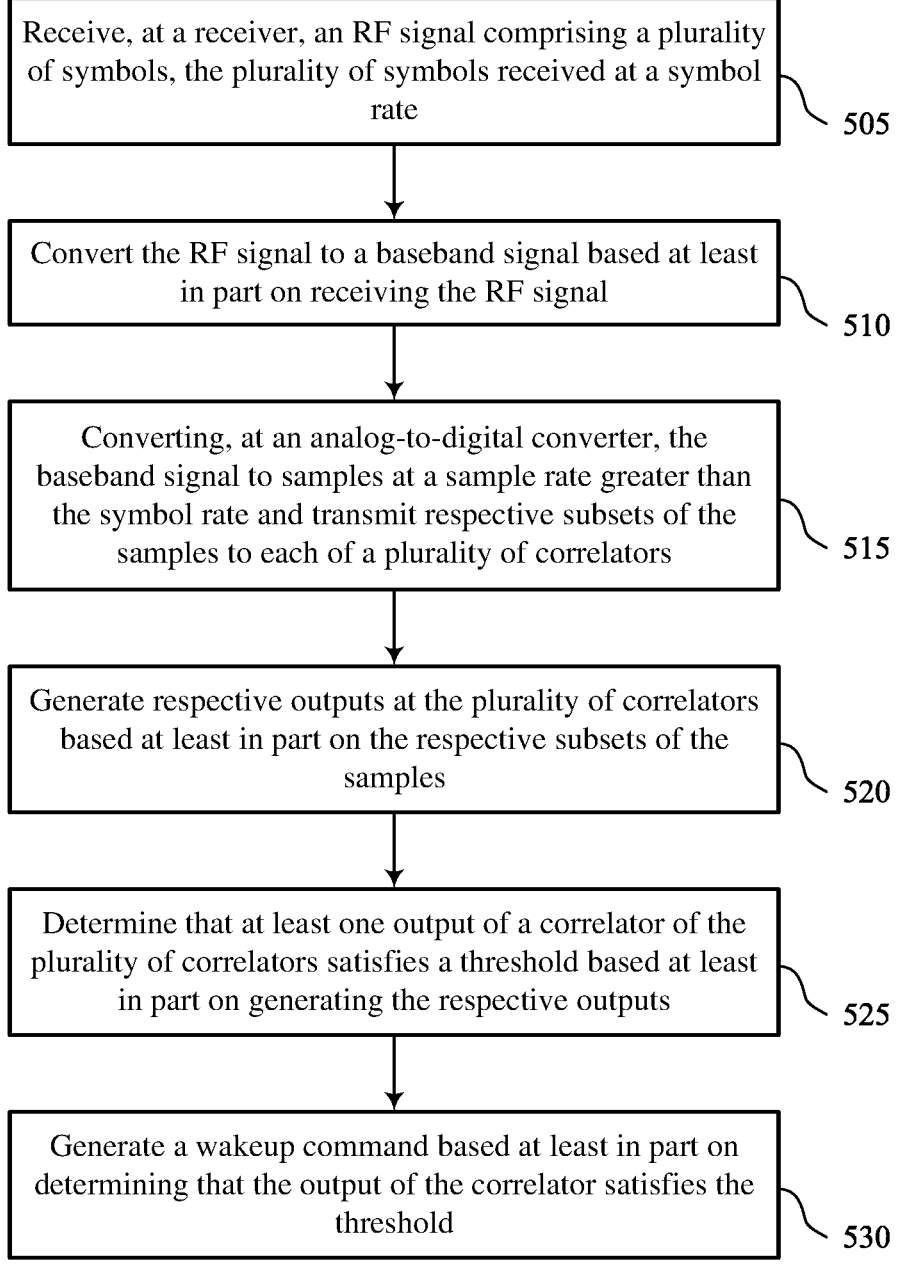

FIG. 5 shows a flowchart illustrating methods that support oversampled multiple-correlator symbol synchronization in accordance with aspects of the present disclosure.

DETAILED DESCRIPTION

A system may include a transmitter and an electronic device including a receiver. In some examples, the receiver may be a low power receiver that activates the electronic device based on a signal from the transmitter—e.g., the electronic device may consume a relatively large amount of power and may remain deactivated when not in use to conserve power. For example, the receiver may be a wakeup receiver, coupled with a high-power radio transceiver, that activates the transceiver based on a signal received from the transmitter. In some examples, utilizing the low power receiver may prolong battery life of the electronic device. In some examples, the receiver may convert the signal from the transceiver into a baseband signal (e.g., modulated symbols). In some cases, the receiver may sample the symbols to determine if the incoming signal is associated with a stored code to activate the electronic device. In some examples, the receiver may sample the signal asynchronously—e.g., the symbol timing (e.g., frequency offset, phase offset) of the receiver may be offset from the symbol timing of the transmitter. For example, the receiver may sample a given symbol twice or not at all based on the clock shift—e.g., the symbol rate being different than the sample rate. In such examples, the receiver may fail to determine the incoming signal is associated with the stored code and fail to activate the electronic device. In some examples, the receiver may consume additional power to synchronize the incoming signal—e.g., determine boundaries of a given symbol and sample the symbol accordingly.

As described herein, a receiver may utilize a set of correlators to sample at a sample rate greater than a symbol rate of a received signal from a transmitter. The receiver may sample the signal without synchronizing a clock used to generate the sample rate with the incoming symbol rate of the signal. For example, the receiver may convert the signal (e.g., an RF signal) received via an antenna from a transmitter into a baseband signal including a plurality of symbols received at a symbol rate. The receiver may then generate samples at a sample rate greater than the symbol rate and transmit respective subsets of samples to a set of correlators. The receiver may generate the samples without synchronizing the sample timing to the symbol timing of the signal (e.g., the clock used for the sample rate may not be locked to the symbol timing using a synchronization symbols or other synchronization techniques). That is, the sample timing may be asynchronous to the symbol timing. The correlators may cross correlate the samples with a stored pseudo-noise code sequence (e.g., PN code) that is associated with the receiver. In some examples, the receiver may generate a wakeup command for a coupled electronic device when one or more outputs of the correlators satisfy a threshold.

For example, the receiver may include N correlators, where a factor of the sample rate to the symbol rate corresponds to the quantity of N correlators—e.g., the receiver may sample the incoming signal at N times the symbol rate (e.g., based on an internal clock or oscillator that may drift from the signal symbol timing, in some cases) based on the N correlators. The quantity of correlators N may be, for example, two, three, four, etc. In some examples, the quantity of correlators is greater than two (e.g., three, four, etc.) Each correlator may receive a different respective interleaved subset of samples. Accordingly, the receiver may ensure that at least one correlator of the N correlators receives an interleaved subset of samples synchronous with the incoming signal—e.g., by sampling at a rate greater than the symbol rate, each symbol may be sampled at least once and the respective interleaved samples may be cross correlated at one of the correlators.

By utilizing the set of correlators, the receiver may reduce the likelihood of oversampling (e.g., sampling at least one symbol of the code sequence twice) or under sampling (e.g., failing to sample at least one symbol of the code sequence) and ensure the electronic device is activated based on the incoming signal from the transmitter. Additionally, the set of correlators may consume relatively small amounts of power and reduce power consumption compared with attempting to synchronize the symbol rate and sample rate before sampling.

Aspects of the disclosure are initially described in the context of a system, circuits, and devices. Specific examples are then described of a wakeup circuit and associated timing diagrams. Aspects of the disclosure are further illustrated by and described with reference to apparatus diagrams and flowcharts that relate to oversampled multiple-correlator symbol synchronization.

Figure 1:
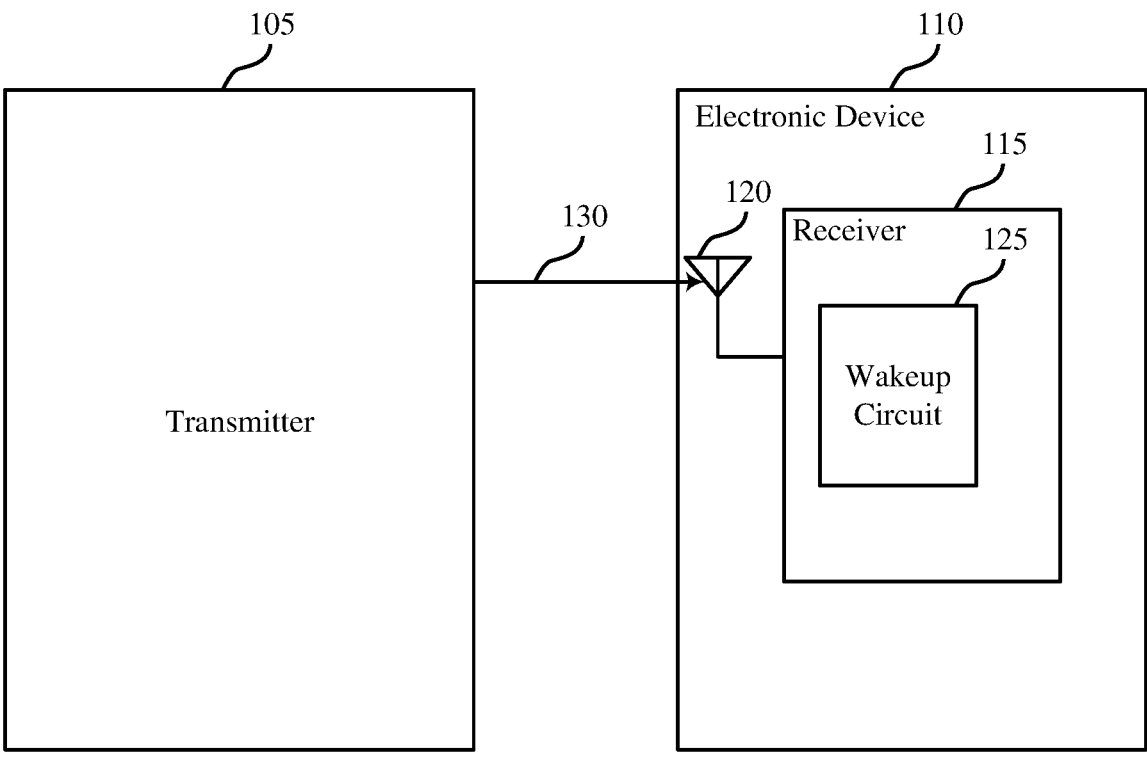
FIG. 1 illustrates an example of a system that supports oversampled multiple-correlator symbol synchronization in accordance with aspects of the present disclosure.

FIG. 1 illustrates an example of a system 100 that supports oversampled multiple-correlator symbol synchronization in accordance with aspects of the present disclosure. The system 100 may include a transmitter 105 and an electronic device 110. The electronic device 110 may include a receiver. The receiver 115 may include an antenna 120 and a wakeup circuit 125.

The transmitter 105 may be configured to transmit a radio frequency (RF) signal to the electronic device 110. In some examples, the transmitter 105 may transmit signal 130 (e.g., a radio frequency (RF) signal) to activate the electronic device 110. In some cases, the transmitter 105 may transmit an RF signal at a carrier frequency modulated with a wakeup sequence at a symbol rate. In some cases, timing (e.g., frequency, timing offset) at the wakeup circuit 125 may not match the timing (e.g., symbol timing of the wakeup sequence) of the signal. The timing at the wakeup circuit 125 may be different than the symbol timing of the signal due to clock drift or other factors. In other examples, the transmitter 105 may also be configured to transmit data to the electronic device 110.

Electronic device 110 may be an example of a high-power radio transceiver or other electronic package. For example, electronic device 110 may be an example of a light, a siren, a satellite terminal, a two-way radio (e.g., walkie-talkie), or other internet of things (IoT) device. For instance, electronic device 110 may be a high-power radar configured to scan its surroundings (e.g., an amount of water remaining in a water tank). In some examples, electronic device 110 may be battery powered. In other examples, electronic device 110 may consume a relatively large amount of power. In such examples, the electronic device 110 may remain deactivated (e.g., powered off) except for the receiver 115 to reduce power consumption. In some cases, the electronic device 110 may be activated based on a signal 130 received from the transmitter 105. In other examples, the electronic device 110 may also be configured to receive data from the transmitter 105 when the electronic device 110 is activated.

Receiver 115 may be an example of a wakeup receiver. That is, receiver 115 may be configured to consume low amounts of power while remaining activated (e.g., powered on) and monitoring for a signal 130 from the transmitter 105. In some examples, the receiver may include an antenna 120 configured to receive the signal 130. The receiver 115 may also include a wakeup circuit 125 configured to correlate the received signal 130 with a stored code associated with the receiver 115. That is, the wakeup circuit 125 may generate a wakeup command for the electronic device 115 if an incoming signal 130 is associated with the stored code— e.g., the wakeup circuit 125 may monitor incoming signals 130 and generate a wakeup command based on determining the incoming signal 130 is associated with activating the electronic device 110. Accordingly, the electronic device 110 may conserve power by having the low power receiver 115 monitor incoming signals 130 and activating when requested by the transmitter 105. In some examples, the receiver 115 may also be configured to receive data from the transmitter 105. In other examples, there may be a second receiver in the electronic device configured to receive data from the transmitter 115—e.g., the wakeup receiver 115 may be one of a plurality of receivers utilized by the electronic device 110. In other cases, the receiver 115 may be external to the electronic device 110.

Figure 2:
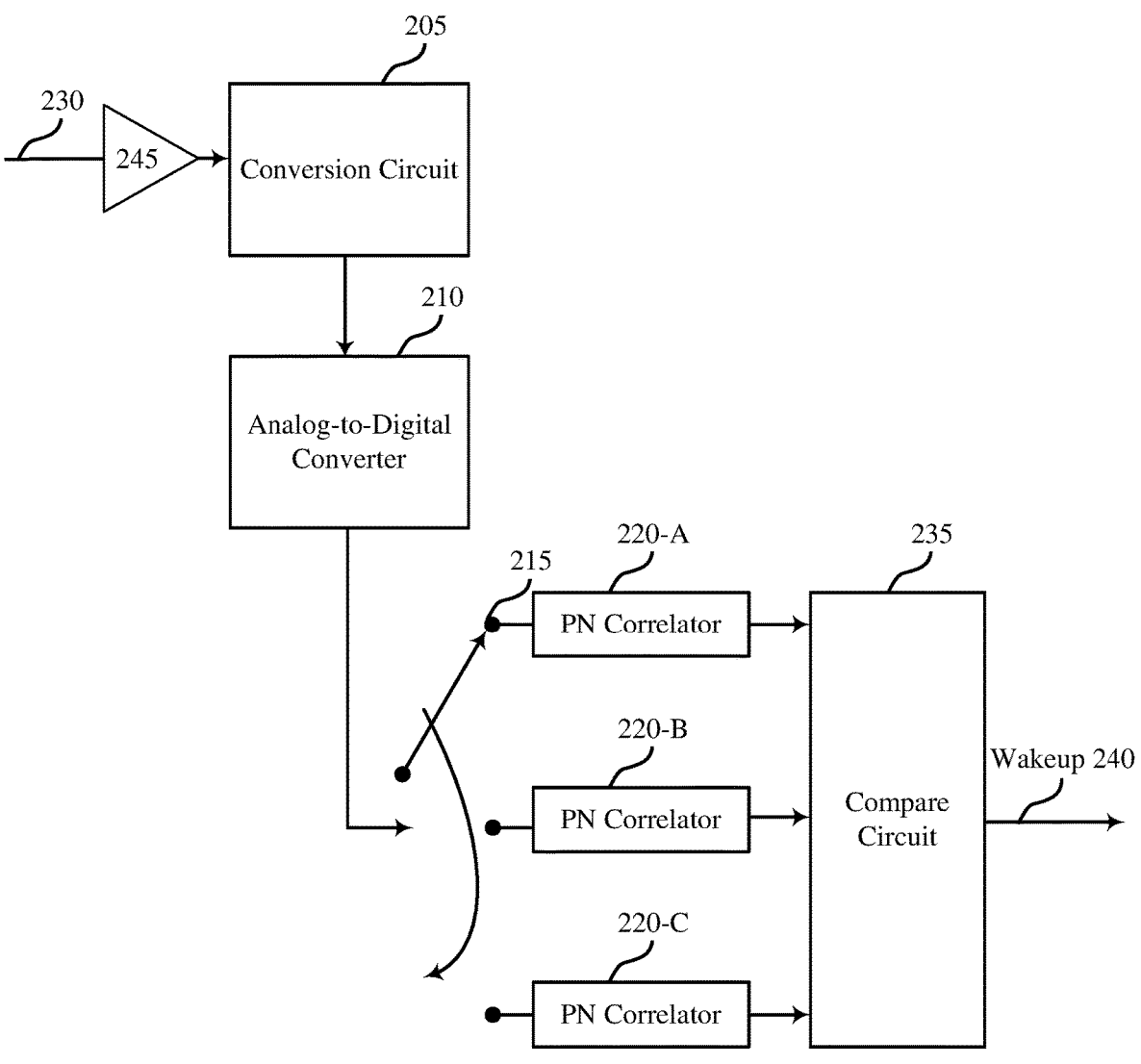
FIG. 2 illustrates an example of a wakeup circuit that supports oversampled multiple-correlator symbol synchronization in accordance with aspects of the present disclosure.

FIG. 2 illustrates an example of a wakeup circuit 200 that supports oversampled multiple-correlator symbol synchronization in accordance with aspects of the present disclosure. In some examples, wakeup circuit 200 may be an example of wakeup circuit 125 as described with reference to FIG. 1. That is, the wakeup circuit 200 may be within a low power receiver (e.g., receiver 115 as described with reference to FIG. 1) and coupled with an antenna (e.g., antenna 120 as described with reference to FIG. 1) to receive a signal 230 (e.g., an RF signal 130 as described with reference to FIG. 1) from a transmitter (e.g., transmitter 105 as described with reference to FIG. 1). The wakeup circuit 200 may include a conversion circuit 205, an analog-to-digital converter 210, a commutator 215, PN correlators 220, a compare circuit 235, and an amplifier circuit 245. In some examples, the conversion circuit 205 and analog-to-digital converter 210 may be external to the wakeup circuit 200—e.g., located elsewhere within the receiver 115.

Conversion circuit 205 may be configured to convert an incoming signal 230 to a baseband signal. For example, the conversion circuit 205 may convert the incoming RF signal 230 by mixing the signal 230 with a carrier frequency from a local oscillator. In some examples, the baseband signal may include a plurality of symbols—e.g., the signal 230 may be modulated with bits of a sequence using phase-shift keying (PSK), Binary phase-shift keying (BPSK), Quadrature phase-shift keying (QPSK), frequency-shift keying (FSK), amplitude-shift keying (ASK), On-Off-Keying (OOK), or other types of modulation. In some examples, an RF carrier frequency is different from the local oscillator frequency—e.g., a frequency of the transmitter or signal 230 is different than a frequency of the receiver 115. The conversion circuit 205 may be configured to output the baseband signal to the analog-to-digital converter 210. In some examples, the signal 230 may include 64 bits—e.g., the conversion circuit 205 may generate 64 symbols.

Analog-to-digital converter 210 may be configured to convert the baseband signal received from the conversion circuit 205 to samples. In some examples, the symbol timing of the transmitter may be different than the symbol timing of the analog-to-digital converter 210 (e.g., different in frequency or offset in time). In some examples, the analog-to-digital converter 210 may sample at a sample rate greater than the symbol rate. For example, the analog-to-digital 210 may sample at the sample rate based on a quantity of PN correlators 220—e.g., a factor of the sample rate to the symbol rate corresponds to the quantity of PN correlators 220. In one example, the analog-to-digital converter 210 may sample at a sample rate approximately three times greater than the sample rate based on wakeup circuit 200 including three (3) PN correlators 220. In other examples, the sample rate may be approximately two times greater, four times greater, five times greater, etc. based on a quantity of PN correlators 220 being two (2), four (4), or five (5) respectively. In some examples, the analog-to-digital converter 210 may generate respective interleaved subset of samples for each PN correlator 220 as described with reference to FIG. 3. Alternatively, a commutator 215 may be placed between the analog-to-digital converter 210 and the PN correlators 220 to generate the interleaved subset of samples for each PN correlator 220. In some examples, each respective interleaved subset of samples generated by the analog-to-digital converter 210 may be distinct—e.g., each respective interleaved subset of samples may include different samples from the other interleaved subsets. In some examples, the analog-to-digital converter 210 may transmit the respective interleaved subsets of samples to each PN correlator 220—e.g., a first respective interleaved subset of samples to PN correlator 220-a, a second respective interleaved subset of samples to PN correlator 220-b, and a third respective interleaved subset of samples to PN correlator 220-c.

PN correlators 220 may be configured to receive respective subsets of samples from the analog-to-digital converter 210—e.g., samples of the baseband signal. In some examples, the PN correlators 220 may cross correlate the received respective subsets of samples with a stored pseudo-noise code sequence (PN code) associated with the receiver. In some cases, the PN correlators 220 may also generate a respective output based on cross correlating the respective subsets of samples with the stored PN code. For example, the PN correlator 220-a may receive the first respective interleaved subset of samples and generate a first output, the PN correlator 220-b may receive the second respective interleaved subset of samples and generate a second output, and the PN correlator 220-c may receive the third respective interleaved subset of samples and generate a third output. Although three (3) correlators 220 are shown, the wakeup circuit 200 may include any quantity of PN correlators 220 greater than two (2). In some examples, two (2) PN correlators 220 may increase a risk of oversampling or under sampling as described with reference to FIG. 3. In other examples, four (4) or more PN correlators 220 may reduce the risk of oversampling or under sampling as described but also consume additional power—e.g., there may be a tradeoff between increasing the sensitivity of the wakeup circuit 200 and the power consumption of the wakeup circuit 200.

Compare circuit 235 may be configured to receive the respective outputs from the PN correlators 220—e.g., the first output, second output, and third output. In some examples, the compare circuit 235 may compare the respective outputs with a threshold. In some examples, the compare circuit 235 may be configured to generate a wakeup command 240 for the electronic device (e.g., electronic device 110 as described with reference to FIG. 1) when at least one output satisfies the threshold. The compare circuit

235 may refrain from generating a wakeup command 240 for the electronic device when none of the respective outputs satisfies the threshold. In some examples, each respective output is compared with the same threshold. That is, the compare circuit 235 may be configured to adjust the threshold (e.g., from a first threshold to a second threshold) but each respective output is compared with the same threshold (e.g., to the first threshold or the second threshold).

Amplifier circuit 245 may be configured to amplify the signal 230 received at the antenna and transmit the amplified signal 230 to the conversion circuit 205. In some examples, the amplifier circuit 245 may be an example of a low-noise amplifier (LNA). In some instances, the receiver may cycle the power of the amplifier circuit at the sample rate. That is, the amplifier circuit 245 may be powered on when a first sample of a first symbol of the baseband signal converted from the signal 230 is sampled. The amplifier circuit 245 may then power off after the first sample. The amplifier circuit 245 may then power on again when a second sample of the first symbol is sampled. Accordingly, the receiver may reduce additional power consumption by cycling the power of the amplifier circuit 245.

In some cases, detection of the code sequence using the techniques described herein may allow the use of phase modulation (e.g., PSK, BPSK, QPSK) for transmission of a code sequence for a wakeup signal, which may have a greater signal energy and more robust detection than some amplitude modulation techniques such as OOK. However, the present techniques may also be compatible with amplitude modulation techniques.

FIG. 3 illustrates an example of a timing diagram 300 that supports oversampled multiple-correlator symbol synchronization in accordance with aspects of the present disclosure. In some examples, timing diagram 300 may illustrate the timing of components as described with reference to FIG. 2. That is, timing diagram 300 may illustrate timing in a wakeup circuit (e.g., wakeup circuit 200 as described with reference to FIG. 2). For example, the timing diagram 300 may illustrate an analog-to-digital converter (e.g., analog-to-digital converter 210) sampling symbols 305 of a baseband signal. That is, the timing diagram 300 may illustrate generating an interleaved subset of samples and transmitting them to correlators (e.g., PN correlators 220 as described with reference to FIG. 2).

In some examples, an analog-to-digital converter may sample a symbol 305-a at a first time—e.g., sample 310-a. In such examples, the analog-to-digital converter may transmit sample 310-a to a first correlator (e.g., PN correlator 220-a as described with reference to FIG. 2). The analog-to-digital converter may then sample symbol 305-a again at a second time—e.g., sample 315-a. In such examples, the analog-to-digital converter may transmit the sample 315-a to a second correlator (e.g., PN correlator 220-b as described with reference to FIG. 2). The analog-to-digital converter may then sample symbol 305-a again at a third time—e.g., sample 320-a. In such examples, the analog-to-digital converter may transmit the sample 320-a to a third correlator (e.g., PN correlator 220-c as described with reference to FIG. 2). In some examples, the analog-to-digital converter may sample the symbols 305 at a sample rate greater than the symbol rate—e.g., a factor of the sample rate to the symbol rate corresponds to the quantity of correlators as described with reference to FIG. 2. Accordingly, the analog-to-digital converter may continue to sample the symbols at the sample rate—e.g., sample 310-b at a fourth time, sample 315-b at a fifth time, sample 320-c at a sixth time, and so forth until sampling samples 310-n, 315-n, and 320-n at an $n^{th}$ $n^{th}+1$, and $n^{th}+2$ time. In some cases, the analog-to-digital converter may also be configured to continue transmitting the samples in an interleaved manner—e.g., sample 310-*b* to the first correlator, sample 315-*b* to the second correlator, sample 320-*c* to the third correlator and so forth until sample 310-*n* is transmitted to the first correlator, sample 315-*n* is transmitted to the second correlator, and sample 320-*n* is transmitted to the third correlator.

Based on the sample rate being greater than the symbol rate, each correlator may receive a distinct respective subset of samples—e.g., the subset of samples 310-*a*, 310-*b*, and 310-*n* may be different than the subset of samples 315-*a*, 315-*b*, and 315-*n*. Additionally or alternatively, each respective subset of samples may not be commutative. That is, a correlator receiving samples 310-*a*, 310-*b*, and 310-*c* may generate a different output than a correlator receiving samples 310-*b*, 310-*a*, and 310-*c*.

As discussed above, the timing of symbols 305 may be unknown to the receiver. In addition, there may be a frequency offset of the receiver (e.g., analog-to-digital converter) when compared to the transmitted symbols 305. Thus, a given correlator may not receive a sample from each symbol—e.g., a respective subset of samples may be offset from the symbol rate enough that oversampling or under sampling may occur. For example, as illustrated in FIG. 3, the sample frequency of the analog-to-digital converter may be relatively slower than the symbol rate, and thus sample 320-*c* may be sampled at symbol 305-*c*. That is, the third correlator may receive a respective subset of samples that includes no samples for symbol 305-*b*. Accordingly, the wakeup circuit may include two (2) or more correlators to reduce a likelihood of oversampling or under sampling. As described with reference to FIG. 2, two (2) correlators may still have a relatively high likelihood of over sampling or under sampling—e.g., if only the first and third correlator are included in the wakeup circuit, the first correlator may fail to sample symbol 305-*n* and the third correlator may fail to sample symbol 305-*c*. In addition, in some cases one or more correlators of the multiple correlators may receive a respective subset of samples that includes a single sample per symbol, but may fail to correlate the code sequence. For example, the timing of a respective subset of samples may not correspond to portions of a modulated waveform that distinguish between different modulated symbols. Thus, at least two (2) correlators, and in some cases at least three (3) correlators, may provide substantially robust detection against oversampling (having more than one sample in at least one symbol), under sampling (having no samples in at least one symbol), or detection failure due to sample timing relative to the symbol timing. In some cases, more than four (4) correlators may increase the power consumption of the wakeup circuit but the additional sensitivity may be negligible when compared with three (3) correlators—e.g., the tradeoff of consuming additional power may outweigh the benefit of reduction in the likelihood of oversampling or under sampling.

In some examples, a correlator receiving samples from each symbol 305 may generate an output associated with a high state (e.g., increased energy) when the respective subset of samples cross correlates with the stored sequence. For example, the second correlator may receive a sample 315 from each symbol 305 and transmit a high state when the respective subset of samples corresponds to the stored sequence—e.g., the transmitter is transmitting an RF signal to activate the electronic device 110. In such examples, the compare circuit (e.g., compare circuit 225 as described with reference to FIG. 2) may compare the high state with a threshold and generate the wakeup command based on the high state satisfying the threshold—e.g., based on the energy of a correlator exceeding a threshold amount. That is, the compare circuit 225 may set a threshold that indicates an incoming RF signal is close enough to the stored sequence and generate the wakeup command based on an output from a correlator exceeding the threshold.

In other examples, multiple correlators may receive samples from each symbol 305 and one or more than one correlator may output a high state when the respective subset of samples cross correlates with the stored sequence—e.g., the compare circuit may generate the wakeup command based on one or more respective outputs. In some examples, the compare circuit or wakeup circuit may determine a reference timing for the plurality of symbols 305 based on a correlator generating the output satisfying the threshold—e.g., the compare circuit or wakeup circuit may determine or estimate (e.g., within a range) the beginning of each symbol relative to an internal symbol timing based on which correlator outputs a high state. In some examples, the compare circuit or wakeup circuit may determine the reference timing based on more than one of the outputs of the correlators. For example, if two (e.g., or more) correlators each output a high state indicating correlation of the received signal, the compare circuit may determine that the sample frequency is relatively similar (accounting for the oversampling factor) to the transmitted symbol frequency and may determine the reference timing based on which correlators of the multiple correlators output a high state indicating correlation of the received signal, and which correlators of the multiple correlators output a low state indicating a lack of correlation of the received signal. In contrast, if only one correlator outputs a high state, the compare circuit may determine that the sample frequency differs (accounting for the oversampling factor) from the transmitted symbol frequency (e.g., or the oscillator frequency used in downconversion may be different from the transmitted carrier frequency). The wakeup receiver may indicate the timing (e.g., rough timing) to the electronic device 110, which may perform additional synchronization to signals received from the transmitter using the estimated or rough timing provided by the wakeup receiver.

In other examples, a correlator may generate an output associated with a low state based on oversampling, under sampling, or the respective subset of samples not cross correlating with the stored sequence. In such examples, the compare circuit may refrain from generating a wakeup command—e.g., because none of the outputs satisfy the threshold.

FIG. 4 shows a block diagram 400 of a receiver 420 that supports oversampled multiple-correlator symbol synchronization in accordance with aspects of the present disclosure. The receiver 420 may be an example of aspects of a receiver as described with reference to FIGS. 1 through 3. The receiver 420, or various components thereof, may be an example of means for performing various aspects of oversampled multiple-correlator symbol synchronization as described herein. For example, the receiver 420 may include a receiving component 425, a converting component 430, a generator component 435, an output component 440, or any combination thereof. Each of these components may communicate, directly or indirectly, with one another (e.g., via one or more buses).

The receiving component 425 may be configured as or otherwise support a means for receiving, at a receiver, a signal (e.g., RF signal at a carrier frequency) comprising a plurality of symbols, the plurality of symbols received at a symbol rate. In some cases, the receiving component 425 may be configured asH or otherwise support a means for amplifying, at an amplifier, the signal received before converting the signal. In some examples, the receiving component 425 is configured to cycle power of the amplifier circuit at the sample rate.

The converting component 430 may be configured as or otherwise support a means for converting the signal to a baseband signal based at least in part on receiving the signal. In some examples, the converting component 430 may be configured as or otherwise support a means for converting, at an analog-to-digital converter, the baseband signal to samples at a sample rate greater than the symbol rate and transmitting respective subsets of the samples to each of a plurality of correlators.

The generator component 435 may be configured as or otherwise support a means for generating respective outputs at the plurality of correlators based at least in part on the respective subsets of the samples. In some cases, to support transmitting the respective subsets of the samples to the plurality of correlators, the generator component 435 may be configured as or otherwise support a means for transmitting a first respective subset to a first correlator of the plurality of correlators, wherein the first respective subset comprises an interleaved subset of the samples. In some examples, to support transmitting the respective subsets of the samples to the plurality of correlators, the generator component 435 may be configured as or otherwise support a means for generating a first respective interleaved subset of the samples for a first correlator. In some instances, to support transmitting the respective subsets of the samples to the plurality of correlators, the generator component 435 may be configured as or otherwise support a means for generating a second respective interleaved subset of the samples for a second correlator parallel to the first correlator. In some examples, the generator component 435 may be configured as or otherwise support a means for generating a third respective interleaved subset of the samples for a third correlator parallel to the first correlator and the second correlator.

In some examples, an RF carrier frequency is associated with a first clock frequency and the baseband signal symbol frequency of the generator component 435 is associated with a second clock frequency different than the first clock frequency. In some examples, to support generating the respective outputs, the generator component 435 may be configured as or otherwise support a means for cross correlating the respective subsets of samples received from the analog-to-digital converter with a stored pseudo-noise code sequence associated with the receiver. In some cases, a factor of the sample rate to the symbol rate utilized by the generation component 435 corresponds to a quantity of correlators in the plurality of correlators. In some examples, each respective subset transmitted to each plurality of correlators by the generator component 435 is distinct.

The output component 440 may be configured as or otherwise support a means for determining that at least one output of a correlator of the plurality of correlators satisfies a threshold based at least in part on generating the respective outputs. In some instances, the output component 440 may be configured as or otherwise support a means for generating a wakeup command based at least in part on determining that the output of the correlator satisfies the threshold. In some cases, the output component 440 may be configured as or otherwise support a means for transitioning an electronic device, coupled with the receiver, from a first power state to a second power state based at least in part on generating the wakeup command. In some instances, the output component 440 may be configured as or otherwise support a means for determining a reference timing for the plurality of symbols based at least in part on a correlator of the plurality of correlators generating the output of the respective outputs that satisfies the threshold.

FIG. 5 shows a flowchart illustrating a method 500 that supports oversampled multiple-correlator symbol synchronization in accordance with aspects of the present disclosure. The operations of the method 500 may be implemented by a receiver or its components as described herein. For example, the operations of the method 500 may be performed by a receiver as described with reference to FIGS. 1 through 4. In some examples, a receiver may execute a set of instructions to control the functional elements of the receiver to perform the described functions. Additionally or alternatively, the receiver may perform aspects of the described functions using special-purpose hardware.

At 505, the method may include receiving, at a receiver, a signal (e.g., RF signal at a carrier frequency) comprising a plurality of symbols, the plurality of symbols received at a symbol rate. The operations of 505 may be performed in accordance with examples as disclosed herein. In some examples, aspects of the operations of 505 may be performed by a receiving component 425 as described with reference to FIG. 4.

At 510, the method may include converting the signal to a baseband signal based at least in part on receiving the signal. The operations of 510 may be performed in accordance with examples as disclosed herein. In some examples, aspects of the operations of 510 may be performed by a converting component 430 as described with reference to FIG. 4.

At 515, the method may include converting, at an analog-to-digital converter, the baseband signal to samples at a sample rate greater than the symbol rate and transmitting respective subsets of the samples to each of a plurality of correlators. The operations of 515 may be performed in accordance with examples as disclosed herein. In some examples, aspects of the operations of 515 may be performed by a converting component 430 as described with reference to FIG. 4.

At 520, the method may include generating respective outputs at the plurality of correlators based at least in part on the respective subsets of the samples. The operations of 520 may be performed in accordance with examples as disclosed herein. In some examples, aspects of the operations of 520 may be performed by a generator component 435 as described with reference to FIG. 4.

At 525, the method may include determining that at least one output of a correlator of the plurality of correlators satisfies a threshold based at least in part on generating the respective outputs. The operations of 525 may be performed in accordance with examples as disclosed herein. In some examples, aspects of the operations of 525 may be performed by an output component 440 as described with reference to FIG. 4.

At 530, the method may include generating a wakeup command based at least in part on determining that the output of the correlator satisfies the threshold. The operations of 530 may be performed in accordance with examples as disclosed herein. In some examples, aspects of the operations of 530 may be performed by an output component 440 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving, at a receiver, a signal (e.g., RF signal at a carrier frequency) comprising a plurality of symbols, the plurality of symbols received at a symbol rate, converting the signal to a baseband signal based at least in part on receiving the signal, converting, at an analog-to-digital converter, the baseband signal to samples at a sample rate greater than the symbol rate and transmitting respective subsets of the samples to each of a plurality of correlators, generating respective outputs at the plurality of correlators based at least in part on the respective subsets of the samples, determining that at least one output of a correlator of the plurality of correlators satisfies a threshold based at least in part on generating the respective outputs, and generating a wakeup command based at least in part on determining that the output of the correlator satisfies the threshold.

Some cases of the method 500 and the apparatus described herein may further include operations, features, means, or instructions for transitioning an electronic device, coupled with the receiver, from a first power state to a second power state based at least in part on generating the wakeup command.

In some instances of the method 500 and the apparatus described herein, transmitting the respective subsets of the samples to the plurality of correlators may include operations, features, circuitry, logic, means, or instructions for transmitting a first respective subset to a first correlator of the plurality of correlators, wherein the first respective subset comprises an interleaved subset of the samples.

In some examples of the method 500 and the apparatus described herein, transmitting the respective subsets of the samples to the plurality of correlators may include operations, features, circuitry, logic, means, or instructions for generating a first respective interleaved subset of the samples for a first correlator and generating a second respective interleaved subset of the samples for a second correlator parallel to the first correlator.

Some cases of the method 500 and the apparatus described herein may further include operations, features, means, or instructions for generating a third respective interleaved subset of the samples for a third correlator parallel to the first correlator and the second correlator.

In some instances of the method 500 and the apparatus described herein, an RF carrier frequency may be associated with a first clock frequency and the baseband signal symbol frequency may be associated with a second clock frequency different than the first clock frequency.

Some examples of the method 500 and the apparatus described herein may further include operations, features, means, or instructions for determining a reference timing for the plurality of symbols based at least in part on a correlator of the plurality of correlators generating the output of the respective outputs that satisfies the threshold.

In some cases of the method 500 and the apparatus described herein, generating the respective outputs may include operations, features, circuitry, logic, means, or instructions for cross correlating the respective subsets of samples received from the analog-to-digital converter with a stored pseudo-noise code sequence associated with the receiver.

In some instances of the method 500 and the apparatus described herein, a factor of the sample rate to the symbol rate corresponds to a quantity of correlators in the plurality of correlators.

In some examples of the method 500 and the apparatus described herein, amplifying, at an amplifier, the signal received before converting the signal.

In some cases of the method 500 and the apparatus described herein, the receiver may be configured to cycle power of the amplifier circuit at the sample rate. In other examples, the receiver may be configured to cycle power of the amplifier circuit based on receiving a packet—e.g., each time a portion of a signal corresponding to a packet is received.

In some instances of the method 500 and the apparatus described herein, each respective subset transmitted to each plurality of correlators may be distinct.

An apparatus is described. The apparatus may include a receiver, including a conversion circuit configured to convert a signal (e.g., RF signal at a carrier frequency) received via an antenna to a baseband signal, the baseband signal comprising a plurality of symbols received at a symbol rate, an analog-to-digital converter configured to convert the baseband signal to samples at a sample rate greater than the symbol rate, a plurality of correlators, each of the plurality of correlators configured to receive a respective subset of the samples of the baseband signal and generate a respective output, and a compare circuit configured to receive the respective outputs from the plurality of correlators and compare the respective outputs with a threshold, wherein the compare circuit is further configured to generate a wakeup command based at least in part on at least one output of the respective outputs satisfying the threshold.

In some examples of the apparatus, a first respective subset of the samples received by a first correlator of the plurality of correlators comprises an interleaved subset of the samples.

In some instances of the apparatus, the analog-to-digital converter may be configured to generate a first respective interleaved subset of the samples and a second respective interleaved subset of the samples based at least in part on receiving a symbol of the plurality of symbols.

In some cases of the apparatus, the analog-to-digital converter may be configured to generate a third respective interleaved subset of the samples based at least in part on receiving the symbol of the plurality of symbols.

In some instances of the apparatus, the plurality of correlators comprises a first correlator configured to receive the first respective interleaved subset of the samples and a second correlator parallel to the first correlator and configured to receive the second respective interleaved subset of the samples.

In some cases of the apparatus, the plurality of correlators further comprises a third correlator parallel to the first correlator and the second correlator configured to receive a third respective interleaved subset of the samples.

In some instances of the apparatus, the plurality of correlators may be further configured to cross correlate the respective subsets of samples received from the analog-to-digital converter with a stored pseudo-noise code sequence associated with the receiver.

In some examples of the apparatus, a carrier frequency of the signal may be different from the baseband signal symbol frequency.

In some instances of the apparatus, the compare circuit may be further configured to determine a reference timing for the plurality of symbols based at least in part on a correlator of the plurality of correlators generating the output of the respective outputs that satisfies the threshold.

In some cases of the apparatus, an electronic device coupled with the receiver and configured to power on based at least in part on receiving the wakeup command.

In some examples of the apparatus, a factor of the sample rate to the symbol rate corresponds to a quantity of correlators in the plurality of correlators.

In some instances of the apparatus, an amplifier circuit configured to amplify the RF signal received at the antenna.

In some cases of the apparatus, the receiver may be configured to cycle power of the amplifier circuit at the sample rate. In other examples, the receiver may be configured to cycle power of the amplifier circuit based on receiving a packet—e.g., each time a portion of a signal corresponding to a packet is received.

In some examples of the apparatus, each respective subset received by each plurality of correlators may be distinct.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a receiver, including:
an amplifier circuit configured to amplify a signal received via an antenna;
a conversion circuit configured to convert the signal received via the antenna to a baseband signal, the baseband signal comprising a plurality of symbols received at a symbol rate;
an analog-to-digital converter configured to convert the baseband signal to samples at a sample rate greater than the symbol rate;
a plurality of correlators, each of the plurality of correlators configured to receive a respective interleaved subset of the samples of the baseband signal and generate a respective output, wherein each respective interleaved subset of the samples is distinct for each of the plurality of correlators based at least in part on the sample rate being greater than the symbol rate; and
a compare circuit configured to receive the respective outputs from the plurality of correlators and compare the respective outputs with a threshold, wherein the compare circuit is further configured to generate a wakeup command based at least in part on at least one output of the respective outputs satisfying the threshold,
wherein the receiver is configured to cycle power of the amplifier circuit at the sample rate.

2. The apparatus of claim 1, wherein the analog-to-digital converter is configured to generate a first respective interleaved subset of the samples and a second respective interleaved subset of the samples based at least in part on receiving a symbol of the plurality of symbols.

3. The apparatus of claim 2, wherein the analog-to-digital converter is configured to generate a third respective interleaved subset of the samples based at least in part on receiving the symbol of the plurality of symbols.

4. The apparatus of claim 2, wherein the plurality of correlators comprises:
a first correlator configured to receive the first respective interleaved subset of the samples; and
a second correlator parallel to the first correlator and configured to receive the second respective interleaved subset of the samples.

5. The apparatus of claim 4, wherein the plurality of correlators further comprises:
a third correlator parallel to the first correlator and the second correlator configured to receive a third respective interleaved subset of the samples.

6. The apparatus of claim 1, wherein the plurality of correlators are further configured to:
cross correlate the respective subsets of samples received from the analog-to-digital converter with a stored pseudo-noise code sequence associated with the receiver.

7. The apparatus of claim 1, wherein a carrier frequency of the signal is different from a baseband signal symbol frequency corresponding to the symbol rate of the baseband signal.

8. The apparatus of claim 1, wherein the compare circuit is further configured to:
determine a reference timing for the plurality of symbols based at least in part on a correlator of the plurality of correlators generating the output of the respective outputs that satisfies the threshold.

9. The apparatus of claim 1, further comprising:
an electronic device coupled with the receiver and configured to power on based at least in part on receiving the wakeup command.

10. The apparatus of claim 1, wherein a factor of the sample rate to the symbol rate corresponds to a quantity of correlators in the plurality of correlators.

11. The apparatus of claim 1, wherein each respective subset received by each plurality of correlators is distinct.

12. A method, comprising:
receiving, at a receiver via an antenna, a signal comprising a plurality of symbols, the plurality of symbols received at a symbol rate;
amplifying the signal at an amplifier circuit;
converting, after amplifying the signal, the signal to a baseband signal based at least in part on receiving the signal;
converting, at an analog-to-digital converter, the baseband signal to samples at a sample rate greater than the symbol rate and transmitting respective interleaved subsets of the samples to each of a plurality of correlators, wherein each respective interleaved subset of the samples is distinct for each of the plurality of correlators based at least in part on the sample rate being greater than the symbol rate;
cycling power of the amplifier circuit at the sample rate;
generating respective outputs at the plurality of correlators based at least in part on the respective interleaved subsets of the samples;
determining that at least one output of a correlator of the plurality of correlators satisfies a threshold based at least in part on generating the respective outputs; and
generating a wakeup command based at least in part on determining that the at least one output of the correlator satisfies the threshold.

13. The method of claim 12, further comprising:
transitioning an electronic device, coupled with the receiver, from a first power state to a second power state based at least in part on generating the wakeup command.

14. The method of claim 12, wherein transmitting the respective interleaved subsets of the samples to the plurality of correlators further comprises:
generating a first respective interleaved subset of the samples for a first correlator; and
generating a second respective interleaved subset of the samples for a second correlator parallel to the first correlator.

15. The method of claim 14, further comprising:
generating a third respective interleaved subset of the samples for a third correlator parallel to the first correlator and the second correlator.

16. The method of claim 12, wherein an RF carrier frequency is associated with a first clock frequency and a baseband signal symbol frequency corresponding to the symbol rate of the baseband signal is associated with a second clock frequency different than the first clock frequency.

17. The method of claim 12, further comprising:
determining a reference timing for the plurality of symbols based at least in part on a correlator of the plurality of correlators generating the at least one output of the respective outputs that satisfies the threshold.

18. The method of claim 12, wherein generating the respective outputs further comprises:

cross correlating the respective subsets of samples received from the analog-to-digital converter with a stored pseudo-noise code sequence associated with the receiver.

19. The method of claim 12, wherein a factor of the sample rate to the symbol rate corresponds to a quantity of correlators in the plurality of correlators.

20. The method of claim 12, wherein each respective subset transmitted to each plurality of correlators is distinct.

* * * * *